(12) United States Patent  
Farrell

(10) Patent No.: US 7,992,466 B2  
(45) Date of Patent: Aug. 9, 2011

(54) CABLE-STRIPPING PLIERS

(75) Inventor: Terry C. Farrell, Conneaut Lake, PA (US)

(73) Assignee: Channellock, Inc., Wilmington, DE (US)

( * ) Notice: Subject to any disclaimer, the term of this patent is extended or adjusted under 35 U.S.C. 154(b) by 263 days.

(21) Appl. No.: 11/626,018

(22) Filed: Jan. 23, 2007

(65) Prior Publication Data

US 2008/0173137 A1      Jul. 24, 2008

(51) Int. Cl.  
*H02G 1/12* (2006.01)  
*B21F 13/00* (2006.01)  
*B26B 17/00* (2006.01)

(52) U.S. Cl. ............................................ 81/9.4; 30/90.1
(58) Field of Classification Search ................ 81/9.4, 81/409, 3.07, 3.4, 9.44, 424.5; D8/51, 52, D8/55, 105, 58; 7/107, 117, 128–130, 107.117; 30/90.1, 90.2, 90.6, 90.7, 91.1, 91.2  
See application file for complete search history.

(56) References Cited

U.S. PATENT DOCUMENTS

| | | | | |
|---|---|---|---|---|
| 824,172 | A | * | 6/1906 | Chausse .......................... 30/91.2 |
| 1,333,243 | A | * | 3/1920 | Bowers ......................... 81/424.5 |
| 1,388,398 | A | * | 8/1921 | Adams .............................. 7/107 |
| 2,766,647 | A | * | 10/1956 | Patrick ............................ 81/414 |
| 2,990,735 | A | * | 7/1961 | Manning ......................... 30/91.2 |
| 3,585,704 | A | * | 6/1971 | Schroeder ........................ 29/235 |
| 3,685,097 | A | * | 8/1972 | Scott et al. ....................... 452/17 |
| 3,817,126 | A | * | 6/1974 | Koebbeman ................... 81/3.44 |
| 3,902,206 | A | * | 9/1975 | Naquin ............................. 7/107 |
| 4,050,152 | A | * | 9/1977 | Olson ............................ 30/90.1 |
| 4,059,892 | A | * | 11/1977 | Siden ............................. 30/90.1 |
| 4,162,638 | A | * | 7/1979 | McCord ......................... 30/90.1 |
| 4,429,460 | A | * | 2/1984 | Hill et al. ....................... 30/90.1 |
| 4,625,596 | A | * | 12/1986 | Makus .......................... 81/9.44 |
| 4,987,626 | A | * | 1/1991 | Montgomery et al. ........... 7/127 |
| 5,150,488 | A | * | 9/1992 | Yuan et al. ........................ 7/137 |
| 5,560,107 | A | * | 10/1996 | Herbert ......................... 30/90.1 |
| 5,638,602 | A | * | 6/1997 | Wilhelm ........................ 30/254 |
| D400,070 | S | * | 10/1998 | Valdivia .......................... D8/52 |
| D406,031 | S | * | 2/1999 | Toshima .......................... D8/52 |
| 5,996,450 | A | * | 12/1999 | St. John ........................... 81/416 |
| 5,996,540 | A | * | 12/1999 | Hara ........................... 123/90.16 |
| D424,394 | S | * | 5/2000 | Lamond et al. .................. D8/58 |
| 6,167,581 | B1 | * | 1/2001 | Finn ................................ 7/129 |
| 6,332,274 | B1 | * | 12/2001 | Domenge ...................... 30/251 |
| 6,588,039 | B1 | * | 7/2003 | Bates .............................. 7/107 |
| 6,725,486 | B2 | * | 4/2004 | Oka ................................ 7/107 |
| 6,966,244 | B2 | * | 11/2005 | Herbst et al. .................... 81/418 |
| 7,093,364 | B2 | * | 8/2006 | Hsieh ............................ 30/90.1 |
| D543,815 | S | * | 6/2007 | Metcalf .......................... D8/52 |
| 2003/0101852 | A1 | * | 6/2003 | Martinka ........................ 81/407 |

* cited by examiner

*Primary Examiner* — David B Thomas  
(74) *Attorney, Agent, or Firm* — Lackenbach Siegel, LLP

(57) ABSTRACT

A cable stripping pliers has facingly disposed arcuate cutting edges formed at the ends of transversely oppositely disposed arcuate surfaces. The pliers are adjustable to two positions for the jaws to engage differently sized cables. The resilient insulation is disposed away from the arcuate surfaces when the cutting edges cut the resilient insulation for readily removing the insulation from the core material.

8 Claims, 3 Drawing Sheets

CABLE-STRIPPING PLIERS

BACKGROUND OF THE INVENTION

1. Field of the Invention

The present invention relates to cable-stripping pliers. The present invention particularly relates to pliers for cutting resilient cable insulation and stripping the insulation from the cable core material.

2. Background and Discussion of the Prior Art

Insulation stripping pliers are generally known in the art. Typical cable insulation stripping pliers are disclosed in U.S. Pat. No. 4,407,174, granted Oct. 4, 1983 to Schulz and U.S. Pat. No. 4,112,791 granted Sep. 12, 1978 to Werner. Such prior art cable stripping pliers require spring and cam mechanisms to provide the necessary movement of the stripping jaws for cutting and stripping the insulation. The stripping jaws edges were generally elongate straight with acutely angled cutting edges.

Prior art cable insulation stripping pliers were generally constructed with diverse sized cutting edges and a single pivot axis, such as disclosed in U.S. Pat. No. 6,910,401 granted Jun. 28, 2005 to Tapper, U.S. Pat. No. 5,669,132, granted Sep. 23, 1997 to Brimmer, U.S. Pat. No. 5,535,519 granted Jul. 11, 1994, to Brimmer U.S. Pat. No. 6,691,403, granted Feb. 17, 2004, to Murg, U.S. Pat. No. 6,687,991, granted Feb. 10, 2004, to Murg, U.S. Pat. No. 4,083,105, granted Apr. 11, 1978, to Vipond, U.S. Pat. No. 4,607,544, granted Aug. 26, 1986, to Jewell, Jr., U.S. Pat. No. 3,902,206, granted Sep. 2, 1975 to Naquin and U.S. Pat. No. 3,893,199, granted Jul. 8, 1975 to Todaro. Such prior art pliers are generally formed with angled or beveled surfaces which surfaces formed the cutting edge. There is no disclosure of oppositely disposed arcuate surfaces, which arcuate surfaces are transversely disposed to arcuate cutting edges.

The pliers has a two mode or two position adjustable pivot construction, which permits the jaws, in a first mode, to cut insulation for cables to about 1½ inches in diameter, and in the second mode cut insulation for cables up to ¾ inch in diameter, without cutting into the core wire material.

The prior art cable stripping pliers, in cutting resilient insulation, does not generally provide sufficient means to prevent cutting the core metal. The prior art cable stripping pliers were also generally of complex design, construction and operation.

The cable stripping pliers art desires a tool which provides for readily stripping of resilient insulation while not cutting into the core metal and yet is practical in design, manufacture and operation. The present invention provides a solution to the aforesaid art needs and desires.

SUMMARY OF THE INVENTION

The present pliers readily strips resilient polymeric insulation from a cable having core metal material. The pliers, in one principal aspect includes a first member having a handle and a jaw, a second member having a handle and a jaw, and means for pivotably connecting the members so that the handles close the jaws on the resilient insulation, and at least one jaw has oppositely disposed arcuate surfaces and a cutting edge formed at the end of the arcuate surfaces, so that with the jaws closed on the cable the cutting edge cuts the insulation away from the core material. In a further aspect, both jaws comprise like arcuate surfaces with like cutting edges, and the cutting edges are facingly disposed with the jaws closed. Each cutting edge is formed by opposite disposed arcuate contoured surfaces. The cutting edges are themselves arcuate. The arcuate surfaces are transversely disposed to the respective arcuate cutting edge. The cutting edges in cutting the insulation cause the insulation to be spacingly disposed from the arcuate surfaces plier permits readily stripping the insulation.

In a further embodiment, the invention is a pliers for stripping resilient insulation from a cable with a core material, which pliers includes a first member having a handle and a jaw, and a second member having a handle and a jaw, and means for adjustably pivotably connecting the members so that the handles close the jaws in one of two modes on the insulation and each jaw has oppositely disposed arcuate surfaces having an arcuate cutting edge formed at the respective ends of the arcuate surfaces in operable combination with a cable having a core (e.g. metal) and a resilient non-metallic (e.g. polymeric) insulation covering the core. The pliers jaws are closed on the cable, which cause the arcuate cutting edges to cut the insulation, which in turn cause the insulation upon being cut to be disposed away from the arcuate surfaces for readily stripping the insulation from the core metal without cutting into the metal. Each jaw has two oppositely disposed arcuate surfaces that form the arcuate cutting edge. The jaw arcuate surfaces are oppositely disposed with the cutting edges disposed in the same plane. The arcuate cutting edges are transversely disposed to and between surfaces. The cutting edge extends substantially along the lengths of the jaws. The cutting edges are disposed equidistant between the oppositely disposed sides of the respective jaws.

BRIEF DESCRIPTIONS OF THE DRAWINGS

DESCRIPTION OF THE INVENTION

Figure 1:
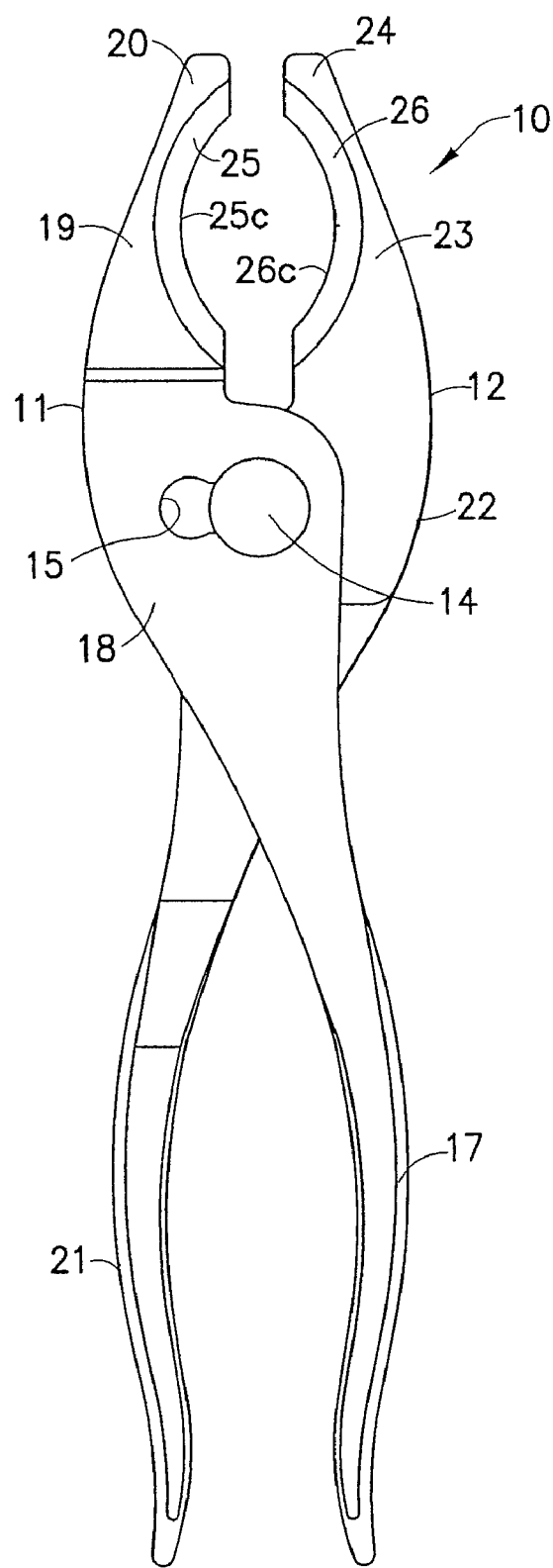
FIG. 1 is a front elevational view of the cable-stripping pliers in a partially opened operable position.
Figure 2:
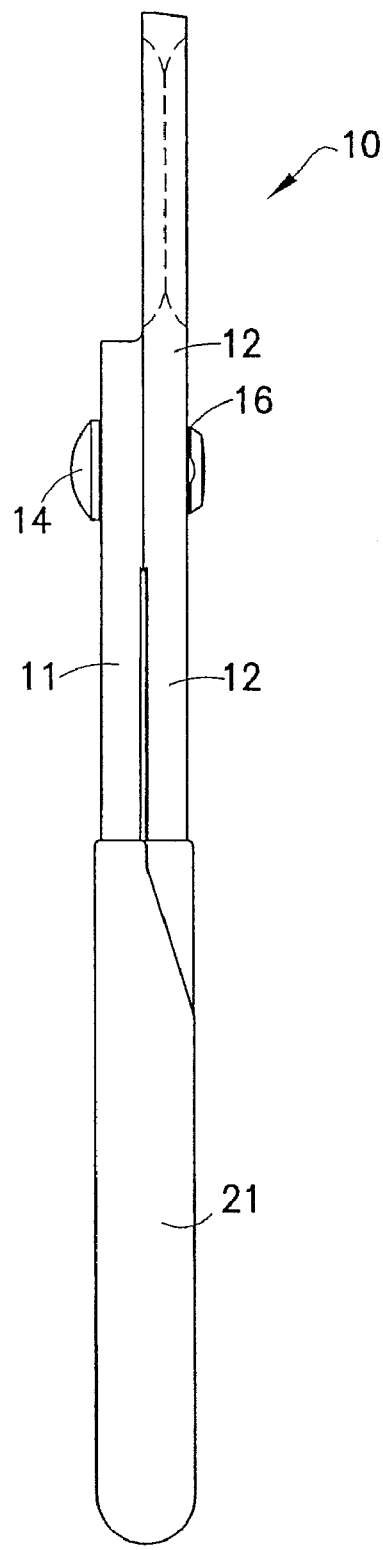
FIG. 2 is a right side elevational view of the pliers as shown in FIG. 1.

Referring to the FIGS., there is shown the cable-stripping pliers 10 of the present invention. Pliers 10 include a first member 11 and a second member 12, and a two- position adjustable pivot assembly for pivotably connecting members 11 and 12. The pivot assembly includes pivot pin 14 and a two-lobe through hole 15. Through hole 15 slidably rotatably receives pivot pin 14. The two-mode or two-position adjustable pivot permits the jaws, in a first mode to cut the insulation for cables up to about 1½ inches in diameter, and in the second mode cut insulation for cables up to ¾ inch in diameter, without cutting into the core material.

Member 11 includes grip handle 17, intermediate portion 18, jaw 19 and distal end 20. Member 11 is of one-piece integral hardened steel construction. Intermediate portion 18 formed with through hole 15. Member 12 includes grip handle 21, intermediate portion 22, jaw 23 and distal end portion 24. Member 12 of one-piece integral hardened steel construction. Intermediate position 22 is formed with through hole 15a for receiving pivot pin 14. Jaws 19 and 23 are formed with specifically configured elongate cutting elements 25 and 26, for reasons hereinafter appearing.

Figure 3:
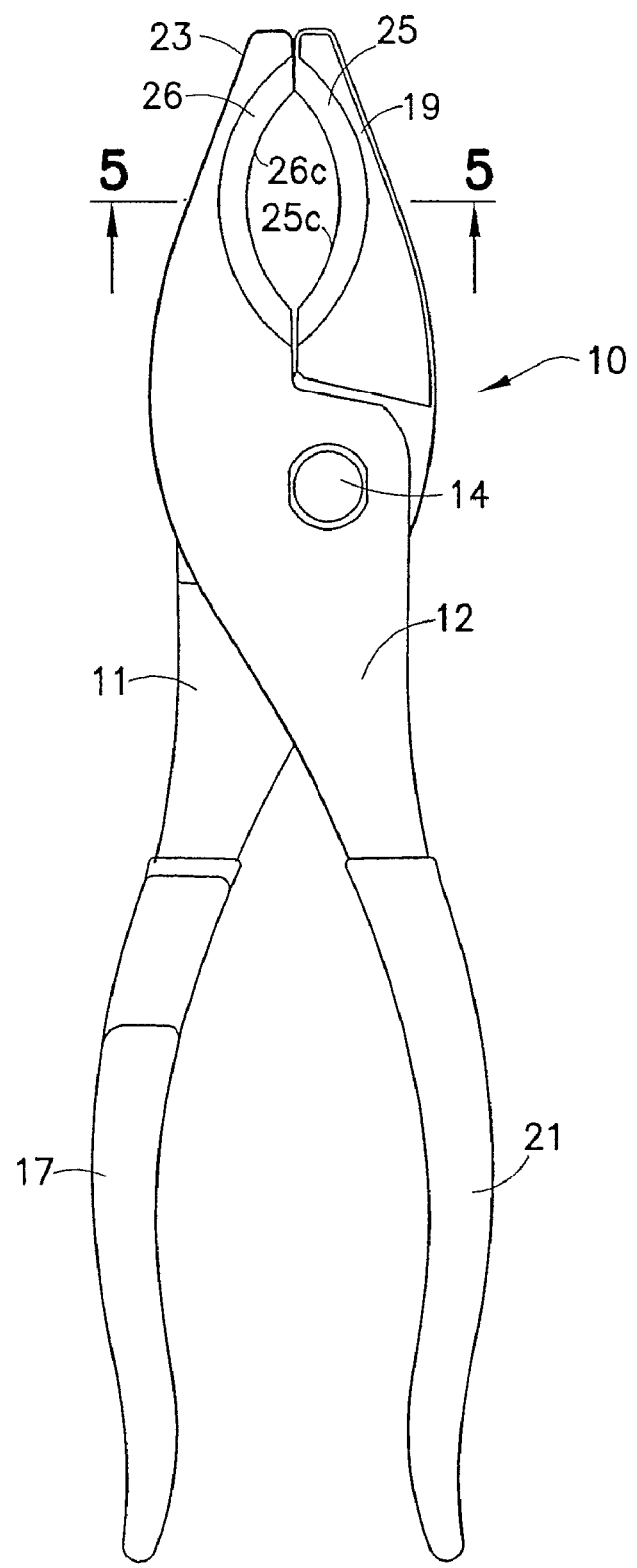
FIG. 3 is a rear elevational view of pliers of FIG. 1 shown in the fully closed position absent a cable.
Figure 4:
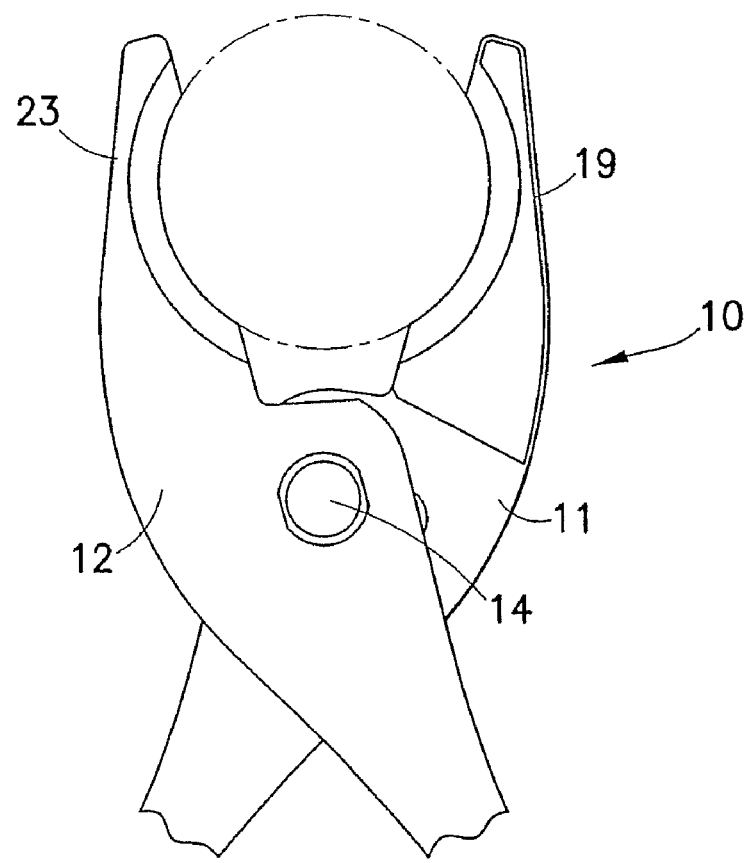
FIG. 4 is a fragmentary view of the pliers of FIG. 3 and the pliers jaws opened and engaging the insulation of a cable.
Figure 5:
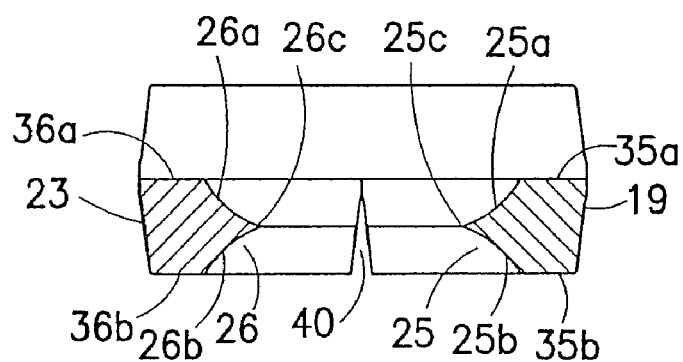
FIG. 5 is an enlarged sectional view taken along lines 5-5 of FIG. 3.

Cutting element 25 is formed of oppositely disposed arcuate surfaces 25c and 25b, which in turn form transversely disposed arcuate cutting edge 25c formed at the end of surfaces 25c and 25b. Cutting element 26 is formed of oppositely disposed arcuate 26 and 26b, which is turn from arcuate cutting edge 26c (FIG. 5). Cutting edges 25c and 26c are disposed in the same plane, and are facingly disposed with the jaws 19 and 23 fully closed (FIG. 3). It is understood that in the preferred embodiment, at least one jaw includes an arcuate forming an arcuate cutting edge surface. Each cutting edge 25c and 26c extends substantially along the length of each elongate jaw. The cutting edges are not contactingly engaged with the jaws closed, but rather spacedly disposed. The distal ends of the jaws are contactingly engaged in the fully closed position adjacent V-groove 40. The cutting edges are 25c and 26c disposed equidistant between the oppositely disposed sides 35a, 35b and 36a, 36b, respectively.

The adjustable pliers has a two mode or two operable position adjustable pivot construction, which permits the jaws, in a first mode, to cut insulation for cables to about 1½ inches in diameter, and in the second mode cut insulation for cables up to ¾ in diameter, without cutting into the core wire material.

In the aforesaid manner of construction, the handles are gripped and close the jaws on a cable. The arcuate surface cut into the insulation and in doing so cause the resilient insulation to move away from the arcuate surface. This construction and operation permits the ready stripping of the resilient polymeric insulation for the core metal.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

What is claimed is:

1. A pliers for stripping insulation from a cable having resilient insulation material covering a core material, said pliers comprises:
   a) a first member comprising a handle and a jaw having a proximate end and a distal end;
   b) a second member comprising a handle and a jaw having a proximate end and a distal end;
   c) means for pivotably connecting the members so that the handles are disposed in respective first and second handles fully closed inoperable positions and then disposed in respective first and second handles and jaws opened operable positions;
   d) each jaw comprises an arcuate cutting edge extending substantially along the length of the jaw from the jaw distal end to the jaw proximate end, each arcuate cutting comprises the same arc, and the arcuate cutting edges being disposed in the same plane;
   e) each cutting edge further comprises oppositely and transversely disposed arcuate surfaces;
   f) wherein the arcuate cutting edges in each of the first and second inoperable positions do not comprise a portion of the same circumference, and in the first operable position the entire arcuate cutting edges are facingly disposed and comprises a portion of the same circumference, wherein the cutting edges contacting engage the circumferences of different cables in the first and second operable positions and circumscribes the cable in the first operable position;
   g) whereby in cutting into the insulation with the operably disposed elongate arcuate cutting edges with the transversely disposed cutting edges cause the cut insulation material to be spacedly disposed from the jaws for readily stripping the insulation material away from the core material.

2. The pliers of claim 1, each entire arcuate cutting edge being spacedly from the other entire arcuate cutting edge at the proximate ends of the jaws in the first and second inoperable positions.

3. The pliers of claim 2, said arcs of the transversely disposed arcuate surfaces comprise the same arc.

4. The pliers of claim 1, said jaws comprise upper and lower planar surfaces and said arcuate cutting edges being disposed in the same plane between the upper and lower planar surfaces.

5. In combination:
   (i) a first said cable having a first diameter; and
   (ii) a second said cable having a second diameter;
   (iii) a pliers for stripping insulation from a cable having resilient insulation material covering a core material, said pliers comprises:
      a) a first member comprising a handle and a jaw having a proximate end and a distal end;
      b) a second member comprising a handle and a jaw having a proximate end and a distal end;
      c) means for pivotably connecting the members so that the handles are disposed in respective first and second handles fully closed inoperable positions and then disposed in respective first and second handles and jaws opened operable positions;
      d) each jaw comprises an arcuate cutting edge extending substantially along the length of the jaw from the jaw distal end to the jaw proximate end, each arcuate cutting comprises the same arc, and the arcuate cutting edges being disposed in the same plane;
      e) each cutting edge further comprises oppositely and transversely disposed arcuate surfaces;
      f) wherein the arcuate cutting edges in each of the first and second inoperable positions do not comprise a portion of the same circumference, and in the first operable position the entire arcuate cutting edges are facingly disposed and comprises a portion of the same circumference, wherein the cutting edges contacting engage the circumferences of different cables in the first and second operable positions and circumscribes the cable in the first operable position;
      g) whereby in cutting into the insulation with the operably disposed elongate arcuate cutting edges with the transversely disposed cutting edges cause the cut insulation material to be spacedly disposed from the jaws for readily stripping the insulation material away from the core material.

6. The combination of claim 5, wherein the cutting edges substantially encompass the first cable in the first operable position.

7. The combination of claim 6, each entire arcuate cutting edge being spacedly from the other entire arcuate cutting edge at the proximate ends of the jaws in the first and second inoperable positions, said arcs of the transversely disposed arcuate surfaces comprise the same arc, said jaws comprise upper and lower planar surfaces and said arcuate cutting edges being disposed midway between the upper and lower planar surfaces.

8. The combination of claim 5, wherein the entire arcuate cutting edge of the first jaw and the entire arcuate cutting edge of the second jaw comprise a substantial portion of the first diameter of the first cable in the first operable position.

* * * * *